Patented Jan. 5, 1926.

1,568,658

UNITED STATES PATENT OFFICE.

JOHN I. CRABTREE, OF ROCHESTER, NEW YORK, ASSIGNOR TO EASTMAN KODAK COMPANY, OF ROCHESTER, NEW YORK, A CORPORATION OF NEW YORK.

PRESERVATIVE FOR MOTION-PICTURE FILMS.

No Drawing.   Application filed March 3, 1925.   Serial No. 13,002.

*To all whom it may concern:*

Be it known that I, JOHN I. CRABTREE, a citizen of the United States of America, residing at Rochester, in the county of Monroe and State of New York, have invented certain new and useful Improvements in Preservatives for Motion-Picture Films, of which the following is a full, clear, and exact specification.

This invention relates to preservatives for motion picture film, and has for its object to provide a composition of matter with which such film may be treated, whereby the film will retain its suppleness and elasticity to an unusual degree, and which will tend to prevent the film becoming dry and brittle even when stored for a considerable period in adverse conditions or when respectively used in a projector.

It has been heretofore proposed that materials of a hygroscopic nature be used in the treatment of motion picture film, but it has usually been found that, if enough of such material be used to maintain the film in a sufficiently flexible condition in a very dry atmosphere, it will also cause the film to become excessively moist, or "sweat", in a humid atmosphere.

I have found that, while either glycerine or ethylene glycol have a certain usefulness when used alone for this purpose, a mixture of the two gives results noticeably better than when either is used alone. Film treated with such a mixture does not become too brittle for use on being allowed to remain in a dry atmosphere for a considerable length of time, while in a damp atmosphere it does not become injuriously moist. That is, within wide limits of relative humidity of the atmosphere in which the film is stored, the film retains its flexibility and is in suitable condition for projection, whereas untreated film becomes excessively brittle in an atmosphere of low relative humidity. Film treated with either of the mentioned constituents alone or with any other materials known to me is not useful in such a wide range of conditions. If the test be made by continuously repeated projection of the same length of film, a film subjected to my improved treatment may be used a noticeably greater number of times before it becomes unusable than untreated film or film treated with either ingredient alone, or film submitted to and other treatments, intended for the same purposes, with which I am familiar.

A suitable formula is the following:

Ethylene glycol 25 parts, glycerine 2.5 parts, water to make 100 parts.

Either dry film may be used, or wet film that has been processed but not yet dried. The film is immersed in the above solution for from 1 to 2 minutes, then either squeegeed without rinsing or rinsed for only a few seconds and then dried.

Customarily this would be an additional process after the customary ones, such as developing, fixing, toning and washing and would be the final step before drying. In a continuous machine the film would pass through additional tubes or a tank of the usual kind immediately before entering the drying cabinet.

The proportions in the formula above may be varied within wide limits. The glycerine contents may range from 1 to 10 per cent, and the glycol from 10 to 50 per cent. This would depend in part on known conditions to which the particular film was to be subjected and partly to the amount of rinsing, if any, given it. In general, the amount of glycol would be from 5 to 20 times the amount of glycerine.

The glycerine and ethylene glycol, without water, may be used as a spray but this is not a preferred practice. The water is merely a diluent in any case.

This treatment has been found useful with films the support of which contains either cellulose nitrate or cellulose acetate.

Having thus described my invention, what I claim as new and desire to secure by Letters Patent is:

1. A preservative for motion picture film comprising glycerine and ethylene glycol.

2. A preservative for motion picture film comprising a quantity of glycerine and from five to twenty times as much of ethylene glycol.

3. A preservative for motion picture film comprising a quantity of glycerine, from five to twenty times as much of ethylene glycol, and water.

4. A preservative for motion picture film comprising from one to ten parts of glycerine, from ten to fifty parts of ethylene glycol and water to make one hundred parts.

5. A preservative for motion picture film comprising substantially two and one-half parts of glycerine, twenty-five parts of ethylene glycol and water to make one hundred parts.

6. The method of treating motion picture film to maintain its flexibility that comprises submitting the film to a bath comprising glycerine and ethylene glycol.

7. The method of treating motion picture film to maintain flexibility that comprises submitting the film to a bath containing a quantity of glycerine and from five to twenty times as much ethylene glycol.

8. The method of treating motion picture film to maintain its flexibility that comprises submitting the film to a bath containing from one to ten parts of glycerine, from ten to fifty parts of ethylene glycol and water to make one hundred parts.

Signed at Rochester, New York, this 27th day of February 1925.

JOHN I. CRABTREE.